(12) United States Patent
Sullivan

(10) Patent No.: US 7,730,218 B2
(45) Date of Patent: Jun. 1, 2010

(54) METHOD AND SYSTEM FOR CONFIGURATION AND MANAGEMENT OF CLIENT ACCESS TO NETWORK-ATTACHED-STORAGE

(75) Inventor: Jon Paul Sullivan, Ennis Clare (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 11/888,596

(22) Filed: Jul. 31, 2007

(65) Prior Publication Data

US 2009/0037934 A1 Feb. 5, 2009

(51) Int. Cl.
*G06F 15/173* (2006.01)
(52) U.S. Cl. ...................................... 709/250
(58) Field of Classification Search ................. 709/250, 709/212, 219, 220, 225
See application file for complete search history.

(56) References Cited

U.S. PATENT DOCUMENTS

| | | | | |
|---|---|---|---|---|
| 6,606,690 | B2 * | 8/2003 | Padovano | 711/148 |
| 6,988,125 | B2 * | 1/2006 | Elnozahy et al. | 709/203 |
| 7,120,768 | B2 * | 10/2006 | Mizuno et al. | 711/162 |
| 7,165,096 | B2 * | 1/2007 | Soltis | 709/217 |
| 7,222,194 | B2 * | 5/2007 | Kano et al. | 709/248 |
| 7,263,468 | B2 * | 8/2007 | Chang et al. | 702/187 |
| 7,272,654 | B1 * | 9/2007 | Brendel | 709/229 |
| 7,487,383 | B2 * | 2/2009 | Bensinger | 714/4 |
| 7,526,668 | B2 * | 4/2009 | Shitomi et al. | 714/3 |
| 7,546,324 | B2 * | 6/2009 | Prahlad et al. | 707/204 |
| 7,552,197 | B2 * | 6/2009 | Soltis | 709/217 |

* cited by examiner

*Primary Examiner*—David Y Eng

(57) ABSTRACT

Embodiments of the present invention provide for automated client-computer connection to NAS objects within a networked computer system. In certain embodiments of the present invention, a master-agent process is continuously executed on one or more computers of the networked computer system. The master agent is connected to, manages, and exchanges information with a NAS-object repository. When a client computer is booted, or reinitializes, a client agent running on a client computer communicates with the master agent in order to receive at least one executable code block for each NAS object designated for access by the client computer. By executing these executable code blocks, the client computer can automatically connect to the NAS objects. In certain embodiments of the present invention, the master agent also provides an administration interface that allows a system administrator to configure a networked computer environment with respect to client computers and NAS objects.

15 Claims, 17 Drawing Sheets

METHOD AND SYSTEM FOR CONFIGURATION AND MANAGEMENT OF CLIENT ACCESS TO NETWORK-ATTACHED-STORAGE

TECHNICAL FIELD

The present invention is related to computer networks, distributed storage systems, and, in particular, to a method and system for automated configuration of clients that connect to, and exchange information with, network-attached-storage objects within a networked computer environment.

BACKGROUND OF THE INVENTION

In early computer systems, data-storage devices were either peripheral devices directly connected to computer systems or were internal components of the computer systems. Later, following the advent of computer networking, computer systems were provided the ability to access remote data-storage components through network communications. In general, these remote data-storage components are directly connected to remote computer systems, and access to the remote data-storage systems involves exchanging data with the remote computer systems to which they are attached. The remote computer systems essentially operate as data and file servers. Still more recently, independent, autonomous data-storage devices have been developed for direct access by client computers. These autonomous data-storage devices often store data redundantly, in order to provide fault tolerance, and may be implemented with redundant components in order to provide both hardware fault tolerance and high availability. One class of autonomous data-storage devices includes devices referred to as "network-attached storage devices" ("NAS devices"). NAS devices are generally implemented using relatively stripped-down operating systems to provide remotely-stored file systems for computer systems, referred to as "client computers," that access the NAS devices via network communications. NAS devices may each provide one or more NAS objects, each NAS object representing, to an accessing client computer, the root directory of a file system. NAS devices may also implement data bases, code repositories, and many other types of networked-attached data-serving systems. NAS devices and NAS objects are relatively inexpensive, are relatively straightforwardly incorporated into networked computer environments, and provide flexible, easily augmented data storage for a networked computer environment. However, with the proliferation of NAS devices and NAS objects within many networked computer systems, configuration and management of NAS-object/client-computer connections has become a significant administrative overhead. For this reason, designers, manufacturers, vendors, and users of NAS devices and NAS objects, and of computer systems that access NAS devices and NAS objects, have recognized the need for a unified management and maintenance tool for networked computer environments that include NAS devices and NAS objects.

SUMMARY OF THE INVENTION

Embodiments of the present invention provide for automated client-computer connection to NAS objects within a networked computer system. In certain embodiments of the present invention, a master-agent process is continuously executed on one or more computers of the networked computer system. The master agent is connected to, manages, and exchanges information with a NAS-object repository. When a client computer is booted, or reinitializes, a client agent running on a client computer communicates with the master agent in order to receive at least one executable code block that, when executed by the client agent on the client computer, connects the client computer to each NAS object designated for access by the client computer. In certain embodiments of the present invention, the master agent also provides an administration interface that allows a system administrator to configure a networked computer environment with respect to connection of client computers to NAS objects. Embodiments of the present provide a simple command interface that abstracts the many complex, computer-system-dependent, computer-operating-system-dependent, and NAS-object dependent commands needed for connecting various computer systems of a networked computer environment to the various NAS objects to which they need to connect.

DETAILED DESCRIPTION OF THE INVENTION

The present invention is related to configuration, management, and maintenance of networked computer environments that include client computers which access NAS objects. One embodiment of the present invention is discussed, below, with reference to a series of control-flow diagrams. It should be emphasized, at the onset, that this described embodiment represents only one of many different possible embodiments of the present invention. Client computers, for example, can run one or more of any of a number of different operating systems, each operating system employing different techniques for connecting to and accessing NAS objects. Similarly, NAS objects may be implemented on NAS devices of many different types, using many different types of NAS-device control programs and operating systems. Networked computer environments can be configured in an essentially limitless number of different ways, and may include any of numerous different types of component computers and communications media and may use any of numerous different networking protocols running on different types of computer systems and computer hardware. Thus, the following discussion is intended to provide a general description of one embodiment of the present invention that may be specifically implemented for, and tailored to support, many different types of NAS devices, client computers, and networked computer environments.

Figure 1:
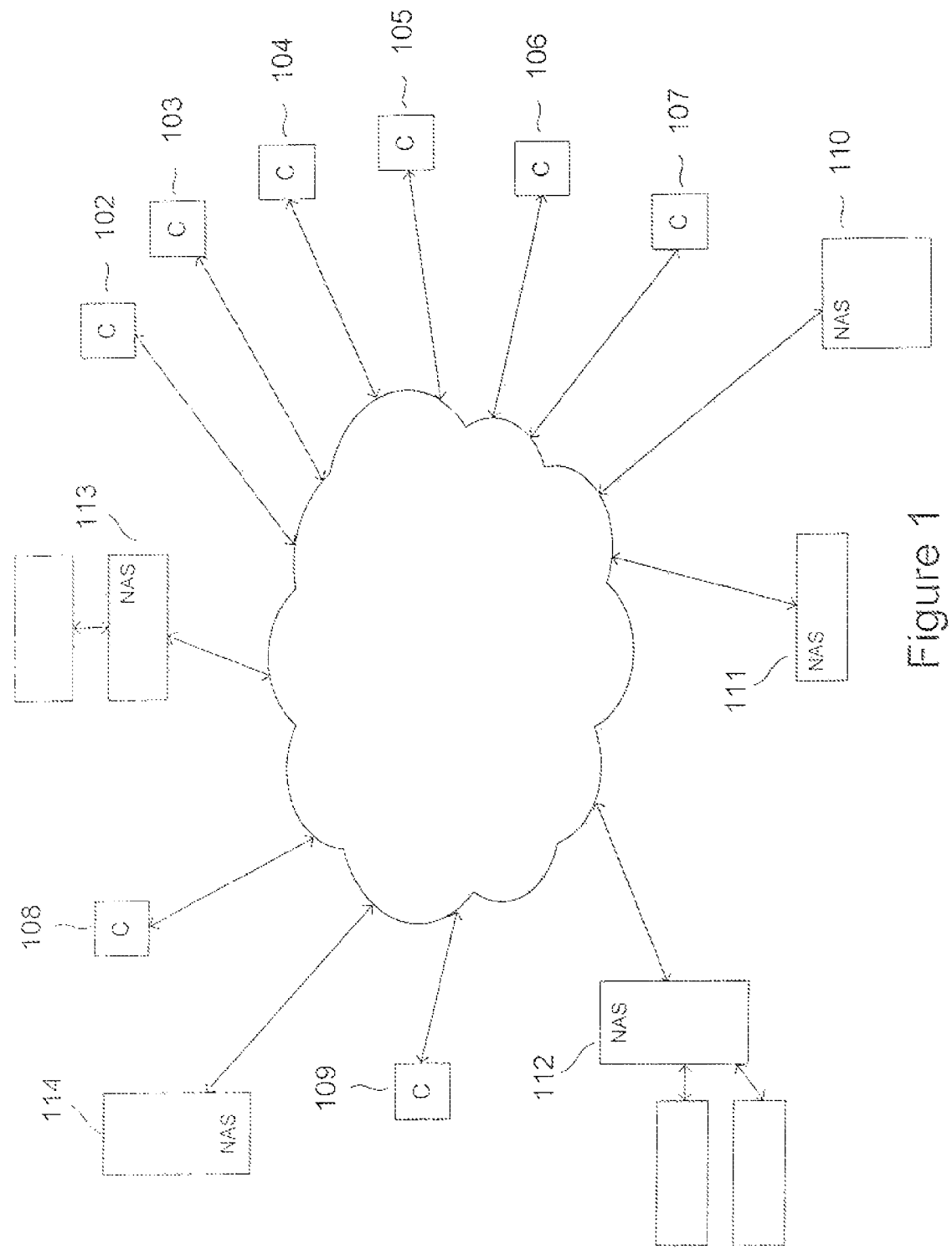
FIG. 1 shows a simple, networked computer environment.

FIG. 1 shows a simple, networked computer environment. The networked computer environment includes a number of client computers 102-109 and a number of NAS devices 110-114 that each provides one or more NAS objects for access by client computers. For the purpose of following the discussion of one embodiment of the present invention, provided below, NAS objects can be considered to be root directories of remote file systems. However, the present invention is intended to provide configuration and automatic connection of computer systems in a networked computer environment to any of the many different types of NAS objects in addition to remote file systems, including networked attached disk devices, such as iSCSI devices, NAS-object-implemented databases accessed via the network, NAS-object-implemented source-code repositories, and many other types of NAS objects. One motivation for the present invention is that, currently, a system administrator may need to choose and issue, or devise scripts or other routines that include, specific examples of an enormous number of possible commands in order to connect a specific computer system to a specific NAS object. The enormous number of possible commands can be considered to essentially comprise a set of commands corresponding to each member of a full cross product of all of the different operating systems, different computer-hardware systems, and NAS-object types within the networked computer environment. As with most types of resources within a network computer system, a given client computer generally accesses only a subset of the available NAS objects. In many cases, a particular client computer only needs to access a relatively small number of NAS objects in order to support application programs, application services, and other such executable entities that run on the client computer. In other cases, information stored within particular NAS objects may have limited access, due to confidential nature of the information stored within the NAS objects, or due to the need to controlling consistency of the data stored in the NAS objects for use by particular types of applications and services.

In general, a networked-computer-environment administrator or manager may develop scripts or configuration routines that execute on each client computer in order to connect the client computer to those NAS objects that the networked-computer-environment manager desires the client computer to have access to. However, because of the number of different operating systems that may execute on the different client computers, because of the number of different types of NAS objects and NAS-device control programs and operating systems, and because of the ever-changing nature of networked computer environments, a networked-computer-environment manager or administrator may need to frequently reconfigure client computers to provide desired connection of the client computers to the NAS objects within the networked computer environment. Moreover, because of failures of, and upgrades made to, NAS devices and client computers, the networked-computer-environment administrator may frequently need to reconfigure all of the client computers, or a large subset of the client computers, within the networked computer environment. Additional types of events may cause the need for reconfiguration of client-computer/NAS-object connects, including various types of changes deliberately made to the networked computer environment and various types of scheduled and unscheduled events, including down time for upgrades and modifications, full and intermittent failures, down times for back-ups, and other such events. Administration client-computer access to NAS objects is therefore a potentially challenging and time-consuming task. For these and other reasons, computer-network-environment administrators, computer-system administrators, and designers, manufacturers, vendors, and users of NAS devices and computers that access NAS devices have all recognized a need for both automated configuration of client-computer connections to the NAS objects within a networked computer environment as well as a command-level abstraction for computer-system-to-NAS-object connection.

Figure 2:
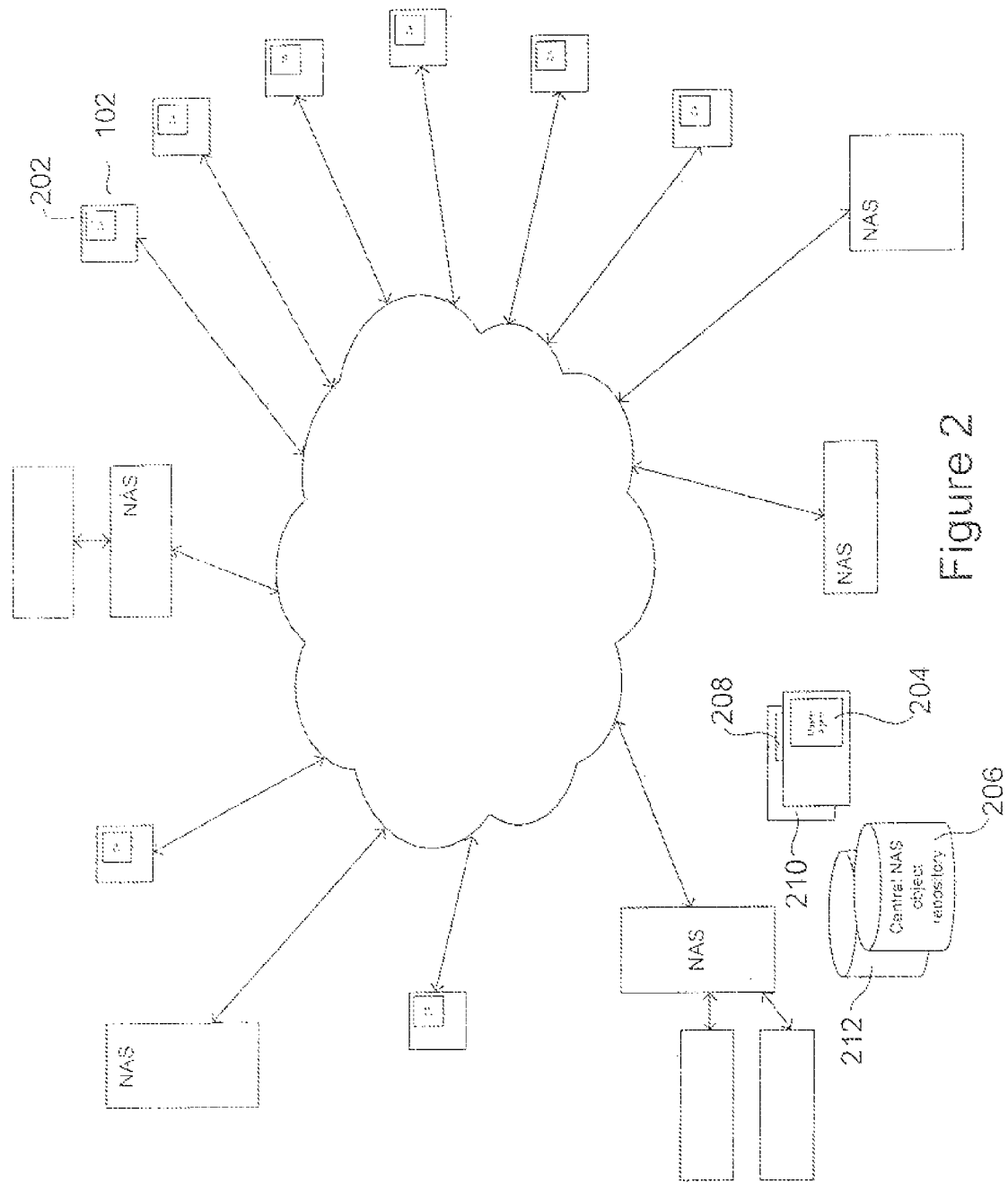
FIG. 2 illustrates components of one embodiment of the present invention within a networked computer environment.

FIG. 2 illustrates components of one embodiment of the present invention within a networked computer environment. FIG. 2 shows the same networked computer environment as shown in FIG. 1, with several additions. First, each client computer, such as client computer 102, includes a client-agent process or daemon 202. Each client agent, such as client agent 202, communicates with a master agent 204 running on a computer system within the networked computer system. It should be noted that a master agent and a client agent may run together on a single computer system, in various implementations of the present invention. The master agent is a continuously executed process or daemon that interacts with client agents on client computers in order to configure client-computer connections to NAS objects within the networked computer environment. The master agent 204 maintains and exchanges information with a central NAS object repository ("repository") 206 stored within a database, file system, or other data-storage system or device. In FIG. 2, the master agent, the system on which the master agent runs, and the repository are shown duplicated, or shadowed, by an additional master agent 208, computer system 210, and repository 212. This illustration convention is meant to indicate that the master agent and repository may be redundantly implemented for fault tolerance and high availability. Techniques for providing a fault-tolerant and highly-available agent or demon and a fault-tolerant and highly-available data-storage component are well known, and are not described further. Instead, in the following discussion, interactions and exchanges between client agents and a single master agent are discussed. However, the single master agent may, in fact, be a highly available and fault-tolerant master agent connected to a highly available and fault-tolerant repository, according to any number of different techniques, including implementation on fault-tolerant computer systems connected to fault-tolerant and highly-available RAID data-storage systems.

Figure 3:
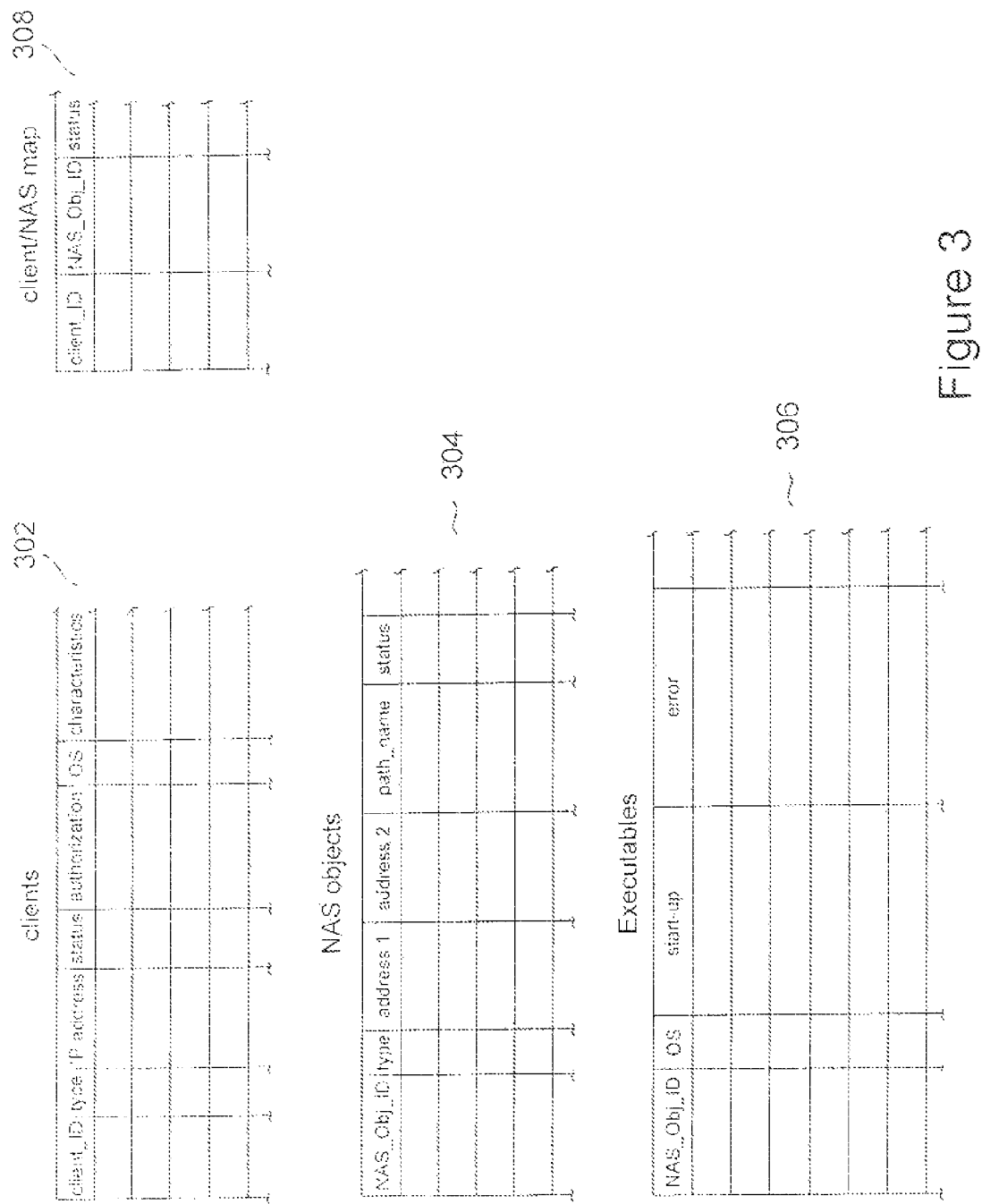
FIG. 3 illustrates a portion of the schema for a relational-database implementation of the central NAS-object repository ("repository") used by the master agent for configuring, maintaining, and managing client-computer/NAS-object connections within a networked computer environment according to one embodiment of the present invention.

FIG. 3 illustrates a portion of the schema for a relational-database implementation of the central NAS-object repository ("repository") used by the master agent for configuring, maintaining, and managing client-computer/NAS-object connections within a networked computer environment according to one embodiment of the present invention. As with other aspects of the described embodiments of the present invention, the repository may be implemented in any number of different ways, using any number of different types of data-storage facilities and techniques, from a single text file to a database management system stored on highly available and fault-tolerant data-storage subsystem.

The portion of the repository schema shown in FIG. 3 includes a clients table 302, a NAS-objects table 304, an executables table 306, and a client/NAS-map table 308. The clients table 302 contains entries for each client computer within the networked computer environment. Each entry includes information that characterizes, and identifies each of the client computers. In a portion of the clients table shown in FIG. 3, fields of each entry include: (1) "client_ID," a unique identifier for each client computer; (2) "type," as indication of the type of client computer; (3) "address," an IP or other network address for the client computer; (4) "status," as indication of the current status of the client computer; (5) "authorization," a field containing one or more passwords or other such information used by the client computer for access to NAS objects. for access by the master agent to the client computer, or for other purposes; (6) "OS," indication of the operating system used by the client computer; and (7) "characteristics," additional information concerning software applications running on the client computer, services provided by the client computer or accessed by the client computer, and other such information. Certain of these fields may be expanded into sets or groups of fields in certain embodiments of the present invention, or may be expanded into additional, supplemental tables in other embodiments of the present invention. For example, the field "type" may contain numerous subfields that specify quantities and types of various hardware components of the client computer, including networking controllers, internal mass-storage components, processor or processors, including processor speed, instruction set, etc.

The NAS-objects table 304 includes entries that describe and characterize each NAS object available within the networked computer environment. As with the table clients, the NAS-objects table entries include a unique identifier for each NAS object, indications of the type, network address or network addresses of the NAS object, a path name, and a status. Again, many additional fields may be used to more fully characterize NAS objects.

In one embodiment, the executables table 306 includes executable code blocks for each NAS-object/operating-system pair. The master agent can find, in the executables table, an executable code block to facilitate each operation or command needed to be executed by any of the client computers within the networked computer environment in order to connect to any of the NAS objects, handle errors generated by accesses to any of the NAS objects, disconnect from any of the NAS objects, or carry out any other tasks needed for configuration, maintenance, and management of NAS-object/client associations within the networked computer environment. In alternative embodiments, a portion of the executable code blocks, or all of the executable code blocks, may be instead stored in a static library, such as a file, or may be included in data segments of the master-agent program.

Finally, the client/NAS-map table 308 includes a status for each client-computer/NAS-object pair within the networked computer environment. The client/NAS-map table specifies the allowed connections, or associations, between client computers and NAS objects. The presence of an entry in the client/NAS-map table indicates that the client computer specified in the entry may connect to, and access, the NAS object. The status field of the entry indicates current status of the association, such as "connected," "not connected," and "connecting," or alternative or additional status-encoding strings or numbers.

While the master agent employs the repository for configuration, maintenance, and management of client/NAS-object associations within the networked computer environment, in the general embodiments of the present invention, a system or network administrator is responsible for generating and maintaining certain of the information stored within the repository. For example, the connections and/or associations between client computers and NAS objects, stored within the client/NAS-object map table 308, are generally specified by a system administrator, although the status field of each entry may be automatically generated, updated, and maintained by the master agent as the master agent manages and monitors the networked computer environment. In certain embodiments, the master agent may be able to detect new NAS objects and/or client computers within the networked computer environment and automatically add entries for the new client computers and NAS objects into the clients table 302 and NAS-objects table 304, respectively. However, a system administrator or network administrator may need to provide information for at least a portion of the fields of each new entry, via an administrative interface discussed below.

Figure 4:
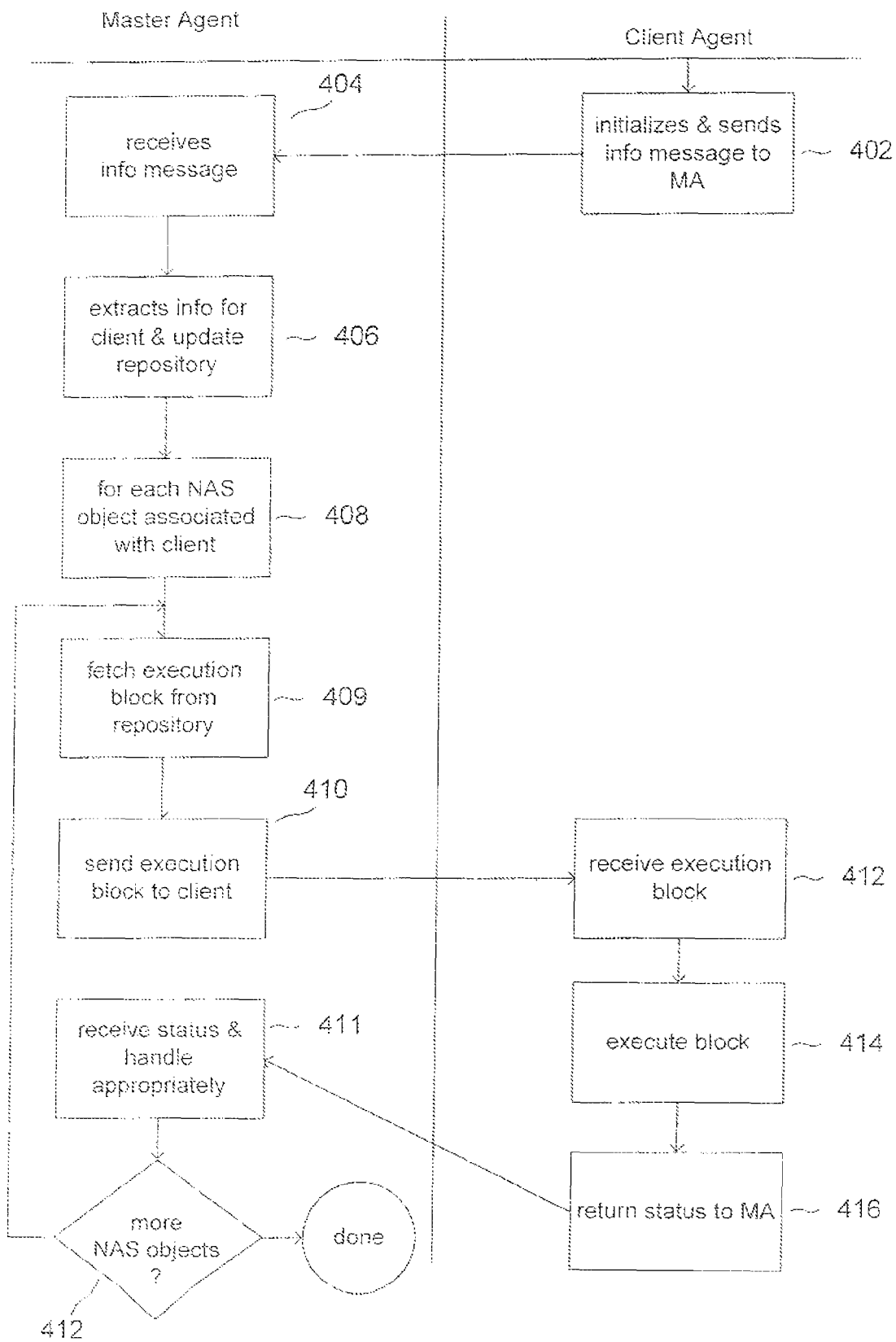
FIG. 4 provides a high-level control-flow diagram that illustrates a basic client-computer/NAS-object connection-configuration strategy implemented by a master agent and a client agent according to embodiments of the present invention.

FIG. 4 provides a high-level control-flow diagram that illustrates a basic client-computer/NAS-object connection-configuration strategy implemented by a master agent and a client agent according to embodiments of the present invention. In a first step 402, the client agent is invoked upon initialization of a client computer, and, upon invocation, sends an information message to the master agent. The master agent receives the information message in step 404, extracts information from the information message regarding the client, and, when necessary, updates an entry for the client in the client table of the repository in step 406. Then, in the for-loop of steps 408-412, the master agent iterates through each association between the client computer on which the client agent runs and a NAS object, as specified by the client/NAS-map table (308 in FIG. 3). For each association, the master agent fetches one or more execution blocks from the repository, in step 409, and sends the execution block to the client agent for execution in step 410. In step 412, the client agent receives the execution block, executes the execution block in step 414, and returns any status or other information obtained as a result of execution of the execution block to the master agent in step 416. In step 411, the master agent receives status and other information returned by the client computer and appropriately handles that information. Alternatively, multiple execution blocks for multiple client-computer/NAS-object connections can be aggregated together in a single message that is sent to the client computer, or into a smaller number of messages than the number of client-computer/NAS-object connections that need to be executed, in order to minimize network-communications overhead. Appropriate handling of the returned status information is discussed in greater detail, below, and is also somewhat implementation dependent. For example, if a client agent fails to connect a client computer to a NAS object by executing an executable code block received from the master agent, the client agent may return an error status that the master agent may then use to infer the nature of the problem that occurred, and undertake remedial actions, if possible, or change the status of the NAS object to indicate that the NAS object is currently unavailable. The for-loop of steps 408-412 continues to iterate until there are no more NAS objects to which the client agent needs to connect.

The technique illustrated by the control-flow diagram in FIG. 4 allows client computers to automatically connect to all of the NAS objects within a networked computer environment to which they are intended to, or allowed to, connect, as specified by a system administrator or network administrator. This is a primary purpose for the client-agent/master-agent system that represents one embodiment of the present invention. However, as discussed further below, the present invention may additionally allow for real-time monitoring of the networked computer environment by the master agent with respect to client-computer/NAS-object connections, updating, reconfiguring, and otherwise managing and maintaining the client-computer/NAS-object connections as specified by information stored in the repository. Next, various aspects of a described embodiment of the present invention are described with reference to a number of control-flow diagrams provided in FIGS. 5-17.

Figure 5:
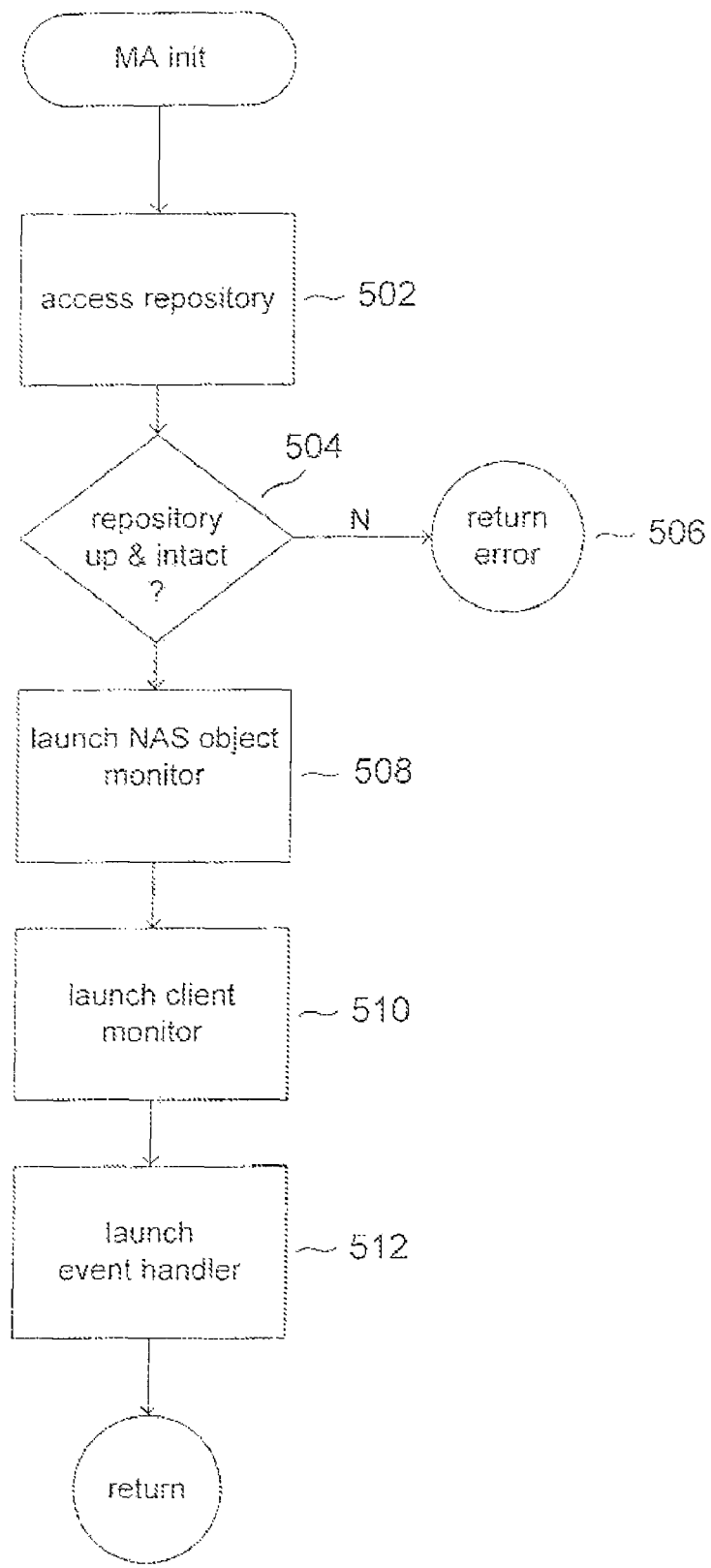
FIG. 5 provides a control-flow diagram for a master-agent initialization routine employed in one embodiment of the present invention.

FIG. 5 provides a control-flow diagram for a master-agent initialization routine employed in one embodiment of the present invention. The master-agent initialization routine may be invoked when the computer on which the master agent runs is booted or reinitialized, or may be expressly run when a system administrator or network administrator decides to reinitialize client-computer/NAS-object connections. In step 502, the master-agent initialization routine accesses the repository in order to determine whether the repository is accessible, consistent, and intact. If not, as determined in step 504, then the master-agent initialization routine may return an error, in step 506, to alert a system or network administrator that the system or network administrator may need to re-initialize or repair the repository prior to starting the master agent. Additionally, the initialization routine may seek to verify information stored in the repository, or reinitialize certain of the information, such as status fields. In step 508, a NAS-object monitor process is launched. In step 510, a client-computer monitor process is launched. Finally, in step 512, an event handler process is launched. Thus, in the described embodiment, three different processes are launched by the master-agent initialization routine to execute continuously in order to monitor NAS objects and client computers within the networked computer environment as well as to handle events that arise within the networked computer environment.

Figure 6:
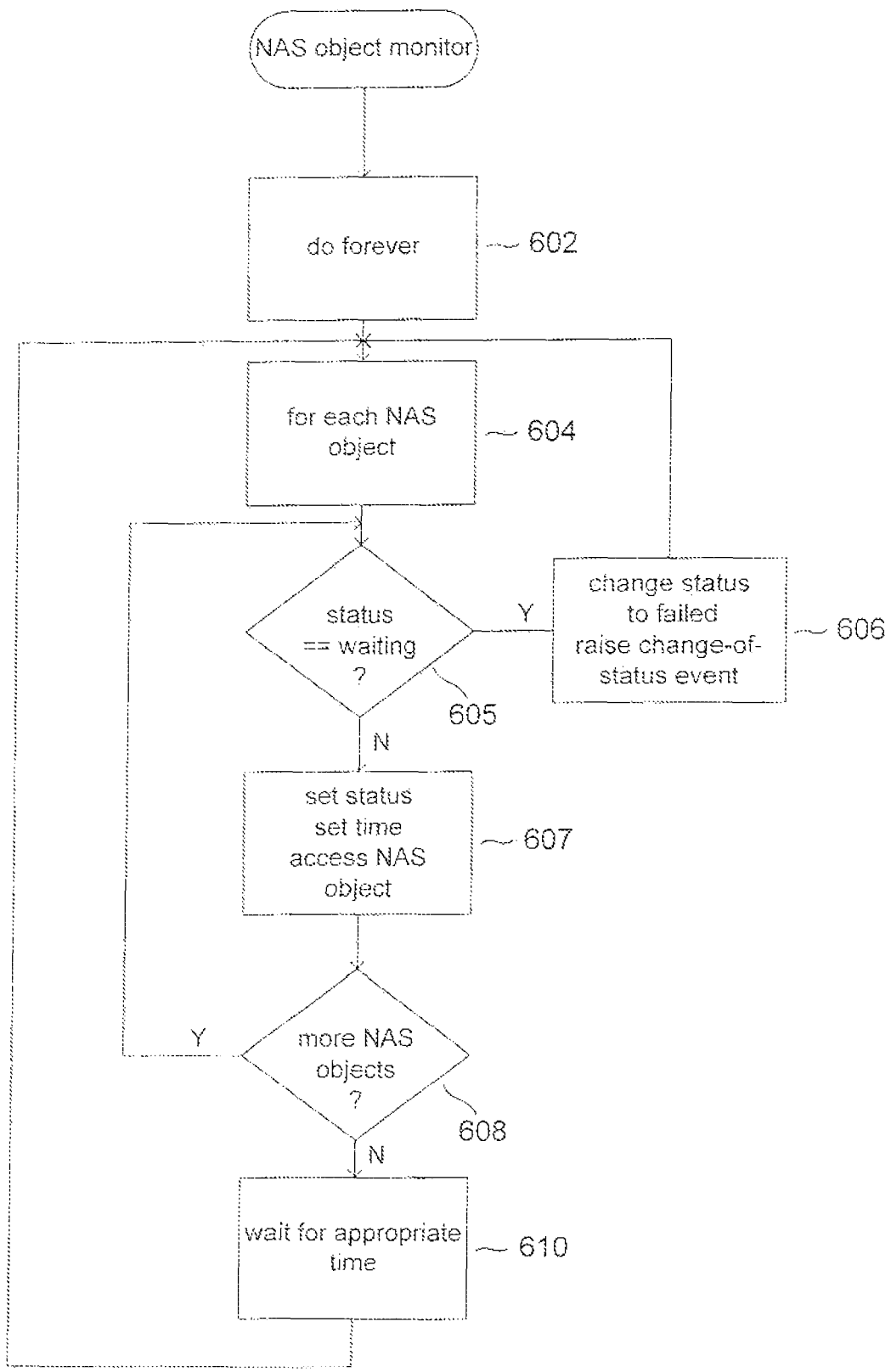
FIG. 6 provides a control-flow diagram for the NAS-object monitor process that continuously executes as part of the master agent according to embodiments of the present invention.

FIG. 6 provides a control-flow diagram for the NAS-object monitor process that continuously executes as part of the master agent according to embodiments of the present invention. The NAS-object monitor routine executes continuously, as represented by the do-forever loop statement in step 602. In the for-loop of steps 604-608, the NAS-object monitor routine checks the status of each NAS object. In step 605, the NAS-object monitor routine determines whether or not the NAS object has successfully replied to a previous access made by the NAS-object-monitor routine. If the status of the NAS object is "waiting," indicating that a previous attempt to access the NAS object by the master agent has failed, then, in step 606, the NAS-object monitor changes the status of the NAS object in the repository and raises a change-of-status event to be handled by the master-agent event handler. Otherwise, in step 607, the NAS-object-monitor routine sets the status of the NAS object in the repository to "waiting," sets a timer associated with the NAS object, and attempts to access the NAS object, as appropriate for the implementation, in order to again determine whether or not the NAS object is currently available within the networked computer environment. After attempting to access each NAS object in the for-loop of steps 604-608, the NAS-object-monitor routine waits, in step 610, for an appropriate period of time before again attempting to access, or send a message to, each NAS object. Thus, the NAS-object-monitoring routine continuously monitors each NAS object within the networked computer environment to ensure that the NAS objects either remain available, or, should any NAS object fail, client computers are accordingly informed of the failure and updated.

Figure 7:
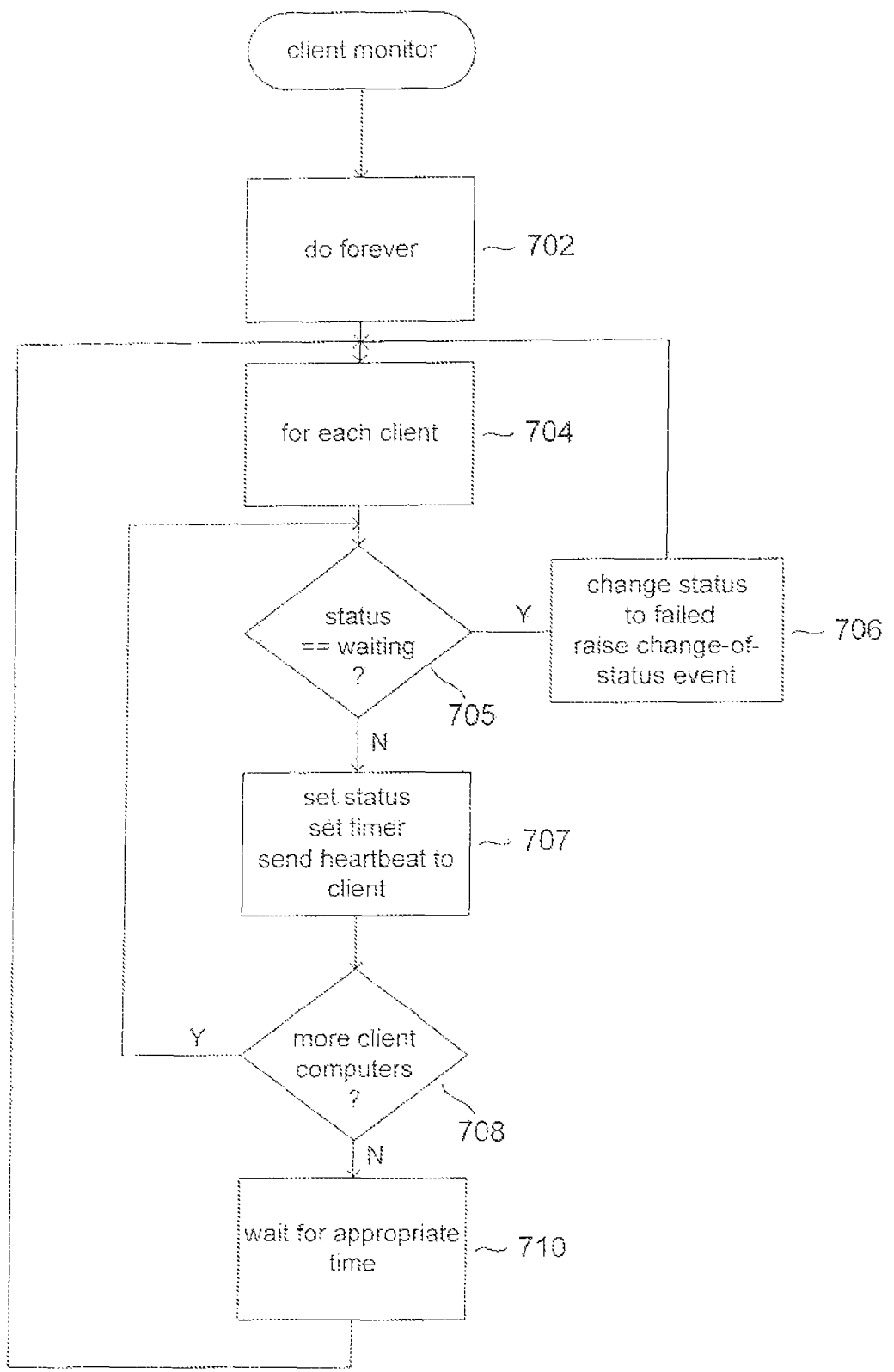
FIG. 7 provides a control-flow diagram for a client-monitor routine, executed continuously on behalf of the master agent, according to embodiments of the present invention.

FIG. 7 provides a control-flow diagram for a client-monitor routine, executed continuously on behalf of the master agent, according to embodiments of the present invention. The client-monitor routine is similar to the above-described NAS-object-monitor routine. As with the NAS-object-monitor routine, the client-monitor routine continuously executes, as represented by the do-forever statement 702. In the for-loop of steps 704-708, the client-monitor routine first checks the status of each client computer, in step 705, to determine whether or not the client computer has appropriately responded to a previously sent heartbeat message. If not, then, in step 706, the client monitor changes the status of the client computer in the repository and raises a change-of-status event. Otherwise, in step 707, the client-monitor routine sets the status of the client computer to indicate sending of a heartbeat message, sets a timer associated with sending of the heartbeat message, and sends the heartbeat message to the client computer. The for-loop of steps 704-708 continues until all client computers have been sent heartbeat messages, or have their status changed to reflect a failure to respond to a previously sent heartbeat message. Then, in step 710, the client monitor waits for an appropriate period of time before again sending heartbeat messages to the client computers.

Figure 8:
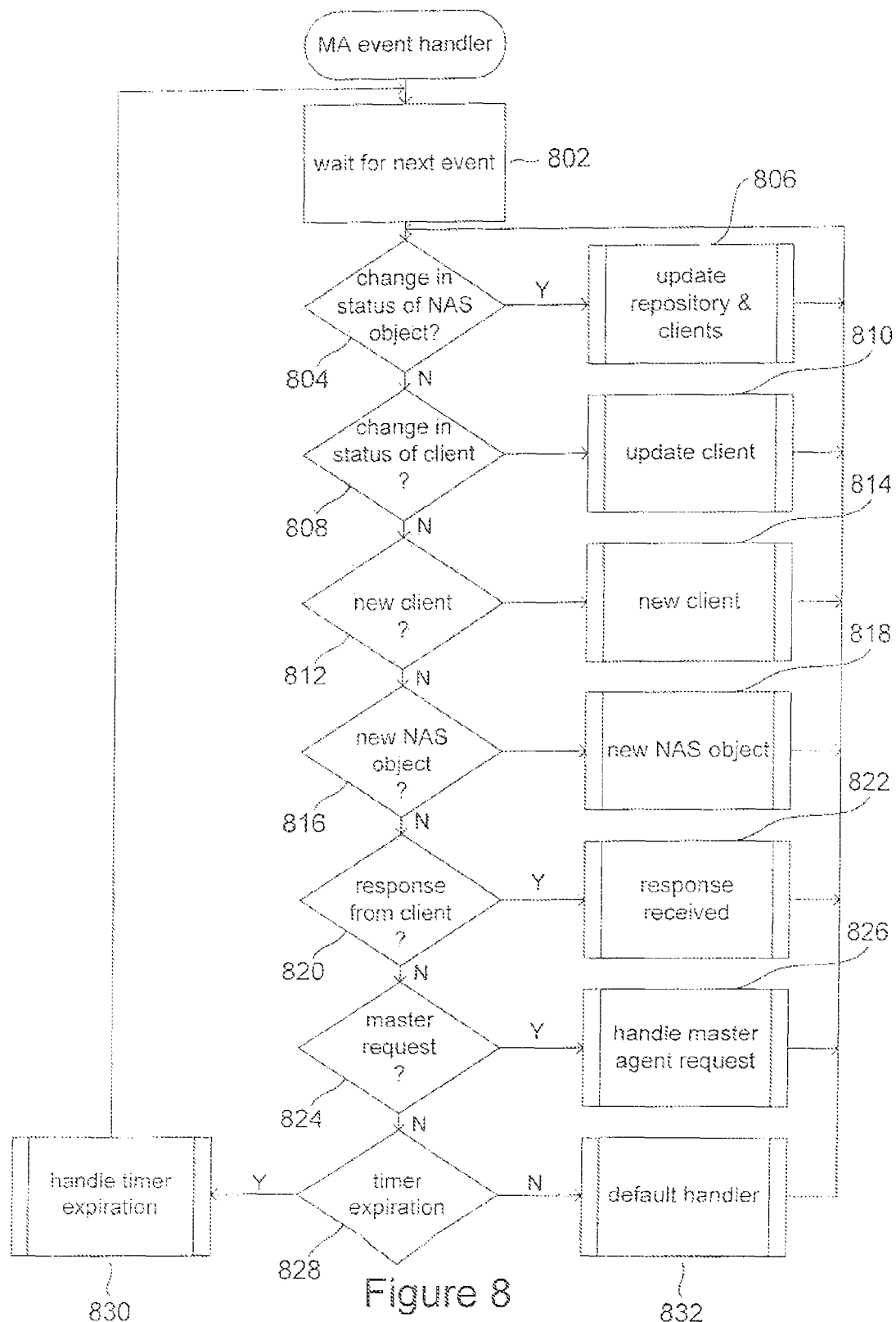
FIG. 8 provides a control-flow diagram for the event-handler routine that, along with the NAS-object-monitor routine and client-computer-monitor routine, comprises the master agent according to a described embodiment of the present invention.

FIG. 8 provides a control-flow diagram for the event-handler routine that, along with the NAS-object-monitor routine and client-computer-monitor routine, comprises the master agent according to a described embodiment of the present invention. The event-handler routine continuously executes, waiting for a next event to occur, in step 802, and then handles the event. If the event is a change-of-status event associated with a NAS object, as determined in step 804, then a "update repository and client" routine is called in step 806 to handle the event. Otherwise, if the event is a change-of-status event associated with a client computer, as determined in step 808, then an "update client" routine is called in step 810. Otherwise, if the event is a new-client event, as determined in step 812, then the routine "new client" is called in step 814. Otherwise, if the event is a new-NAS-object event, as determined in step 816, then the routine "new NAS object" is called in step 818. Otherwise, if the event is associated with reception of a response from a client or response to a NAS-object access, as determined in step 820, then the routine "response received" is called in step 822. Otherwise, if the event is associated with a request issued to the master agent by a system-administrator or network-administrator interface, as determined in step 824, then the routine "handle master agent request" is called in step 826. Otherwise, if the event is a timer expiration, as determined in step 828, then the routine "handle timer expiration" is called in step 830. Otherwise, a default handler is called, in step 832, to handle any other type of event that may occur. While the event-handler routine component of the master agent is shown to sequentially respond to each event, various different types of implementations are possible. For example, the event handler may spawn a separate thread of execution for each event, and may queue and prioritize events, as events are queued and prioritized for execution by operating systems. The implementation of the event-handler routine may depend on characteristics of the networked computer environment, expected event frequencies and timings, the type of operating system. and characteristics of the computer system on which the master agent executes.

Figure 9:
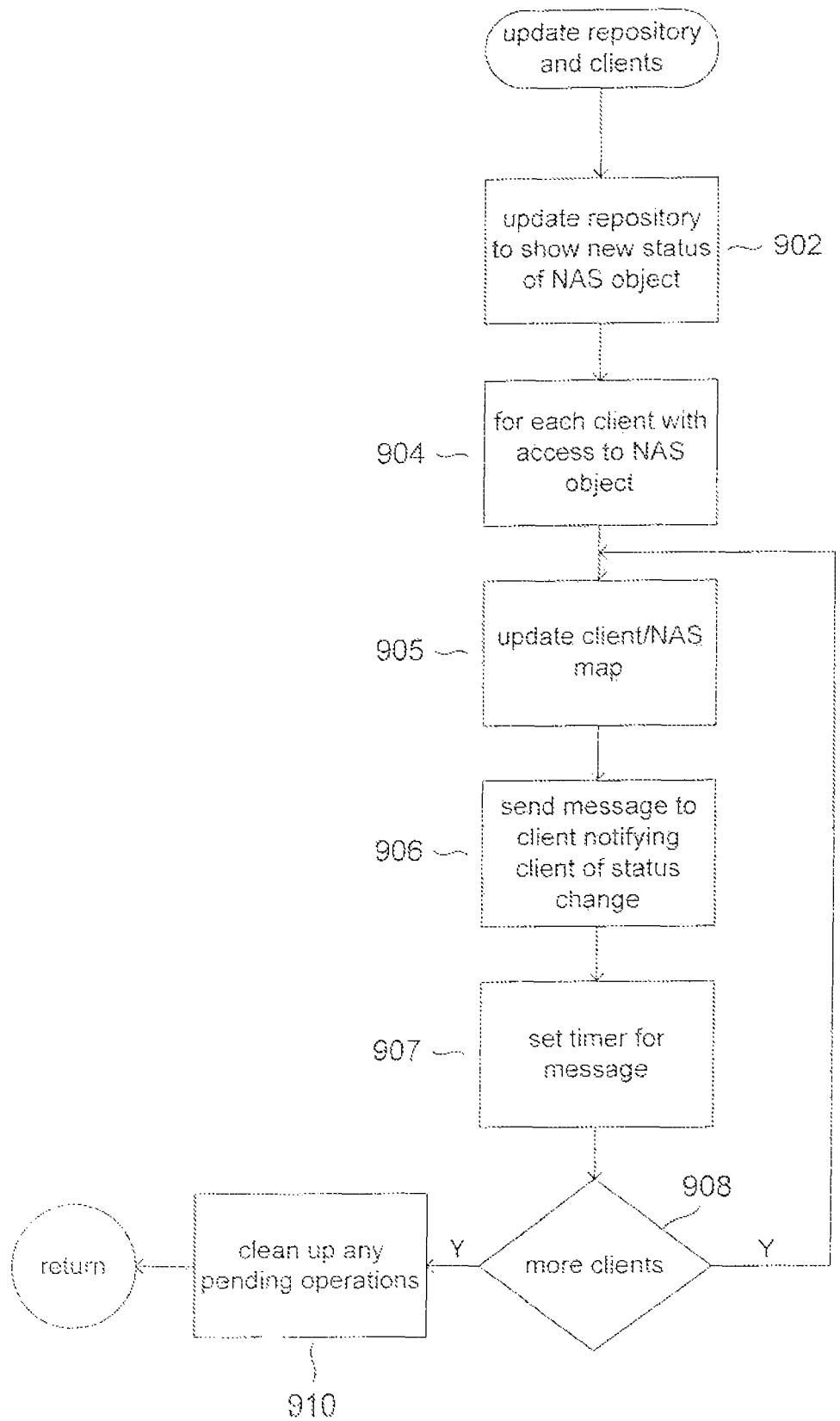
FIG. 9 provides a control-flow diagram for the routine "update repository and clients," called in step 806 of the event-handler routine shown in FIG. 8, according to embodiments of the present invention.

FIG. 9 provides a control-flow diagram for the routine "update repository and clients," called in step 806 of the event-handler routine shown in FIG. 8, according to embodiments of the present invention. In step 902, the repository is updated to show the new status of a NAS object. For example, the status of the NAS object may be updated from "OK" to "failed," "intermittent failure," or some other such status. Then, in the for-loop of steps 904-908, the status in each entry of the client/NAS-object map table (308 in FIG. 3) that includes a NAS object is updated, in step 905, and, in step 906, a message is sent to the client computer indicated in the currently considered entry of the client/NAS-object map table to indicate to the client computer that the status of the NAS object has changed. In step 907, a timer is set for the message sent to the client, to ensure that the client responds. Following notification of each of the client computers that access a NAS object of the change of status of a NAS object, in the for-loop of steps 904-908, any pending operations associated with the NAS object whose status has changed may be cleaned up or otherwise handled in step 910.

Figure 10:
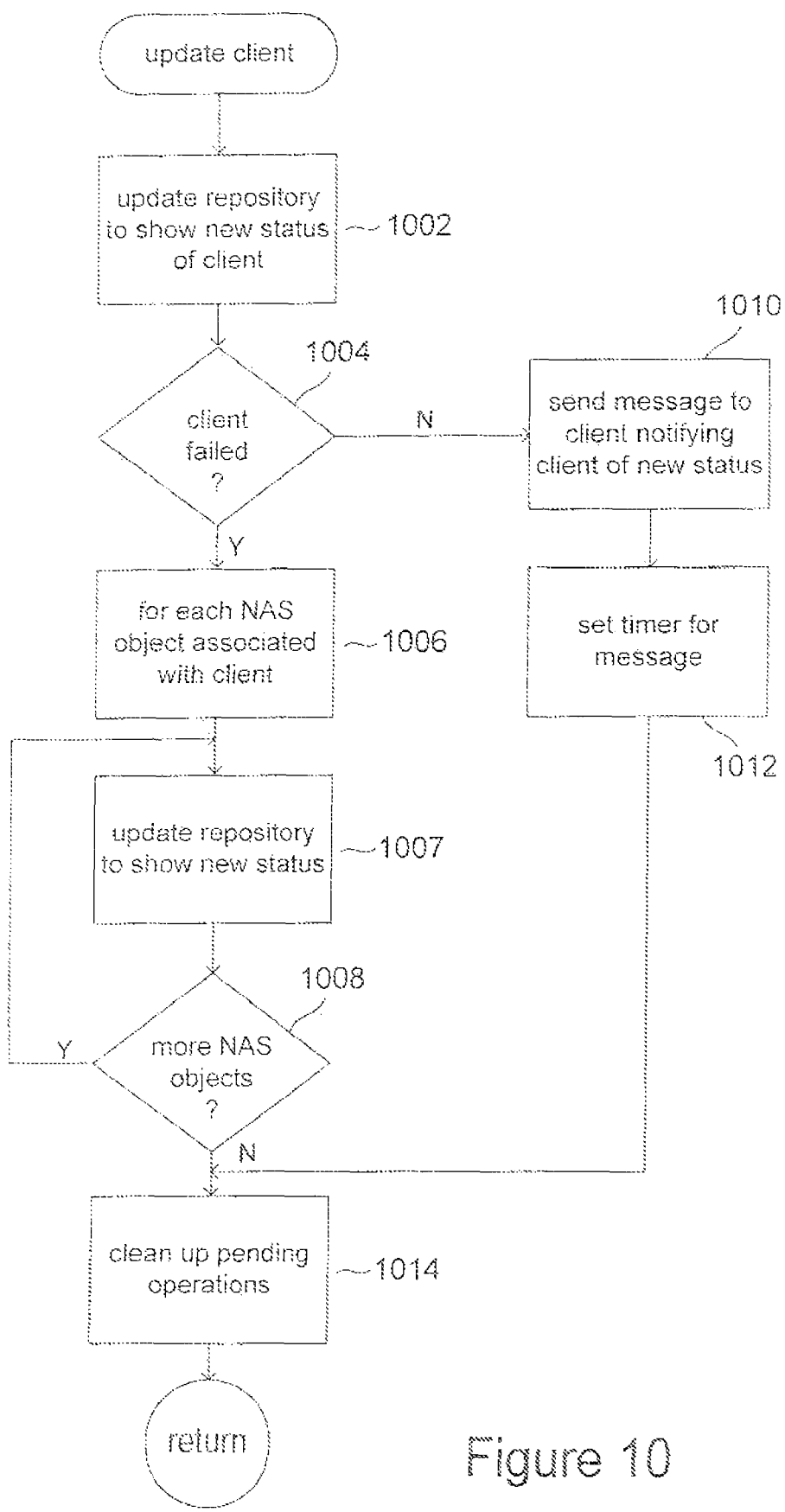
FIG. 10 provides a control-flow diagram for the routine "update client," called in step 810 of the event-handler routine shown in FIG. 8, according to embodiments of the present invention.

FIG. 10 provides a control-flow diagram for the routine "update client," called in step 810 of the event-handler routine shown in FIG. 8, according to embodiments of the present invention. In step 1002, the repository is updated to show a new status for the client computer. If the client computer has failed, as determined in step 1004, then in the for-loop of steps 1006-1008, all entries in the clients/NAS-object-map table (308 in FIG. 3) that include the client computer are updated to show the new status. If the client has not failed, then a message is sent to the client computer notifying the client computer of its new status, in step 1010, and a timer is set to ensure that the client responds to the message, in step 1012. Finally, in step 1014, any pending operations associated with the client computer that cannot now proceed, due to the change in status of the client computer, may be cleaned up or otherwise handled.

Figure 11:
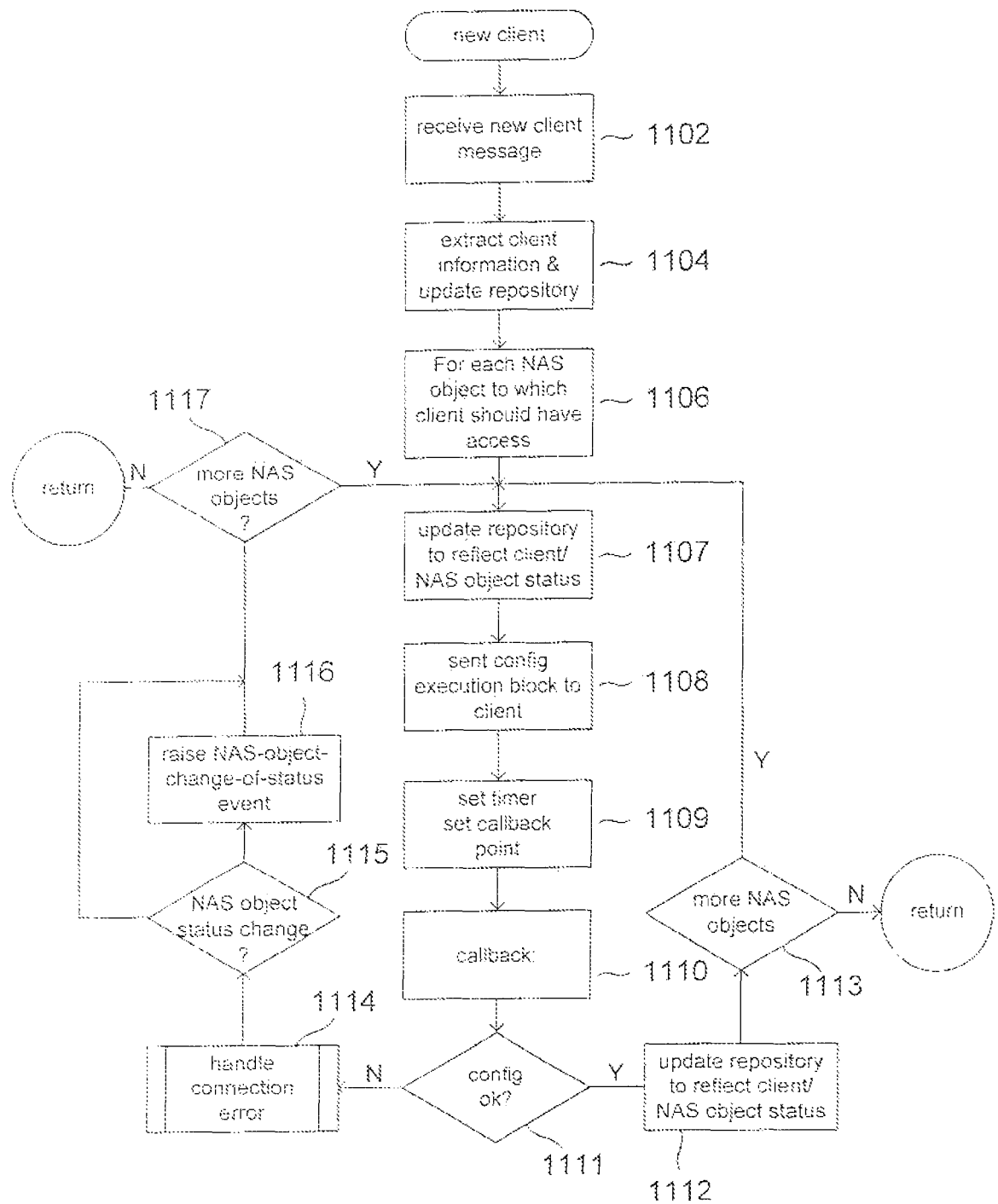
FIG. 11 provides a flow-control diagram for the routine "new client," called in step 814 of the event-handler routine shown in FIG. 8, according to embodiments of the present invention.

FIG. 11 provides a flow-control diagram for the routine "new client," called in step 814 of the event-handler routine shown in FIG. 8, according to embodiments of the present invention. In step 1102, the master agent receives a new message from the client computer. In step 1104, the master agent extracts information about the client from the message and updates the repository, as needed, to reflect the current characteristics and state of the client computer. Then, in the for-loop of steps 1106-1116, the routine "new client" iterates through each NAS object to which the client computer may connect, as specified by the client/NAS-object-map table (308 in FIG. 3), in order to direct the client computer to connect to the NAS object. For each NAS object, the routine "new client" updates the repository to reflect a new status for the client/NAS-object association, in step 1007, and, in step 1108, the routine "new client" sends a configuration execution block to the client for the client to execute in order to connect to the currently considered NAS object. The execution block is retrieved from the executables table (306 in FIG. 3) of the repository. In step 1109, a timer is set for the message sent to the client computer, and a callback point is set for receipt of a response to the message from the client computer. When the client computer responds, following execution of the execution block, then, when the returned status indicates that the connection was made, as determined in step 1111, the routine "new client" updates the repository to reflect the an "OK" status for the client/NAS-object association in step 1112. If there are more NAS objects for the client computer to connect to, as determined in step 1113, then execution returns to step 1107. When the connection is not made, as determined in step 1111, then, in step 1114, a "handle connection error" routine is called in order to handle a failed attempt at connection. If, as a result of this routine, the status of the NAS object is changed, as determined in step 1115, then the routine "newClient" raises a NAS-object-change-of-status event, in step 1116, before either continuing with the for-loop of steps 1106-1117 or returning, as determined in step 1117. Although a callback mechanism is employed, in the described embodiment of the routine "newClient," the routine may also simply wait for a response from the client after sending the client each execution block. Additionally, in certain implementations, the routine "new client" may need to send two or more execution blocks to a client computer for each connection. In that case, the callback step 1110 may direct control back to step 1108, if additional execution blocks need to be sent in order to connect the client computer to the currently considered NAS object, and additional returned-status-handling logic may be included for each additional execution block.

Figure 12:
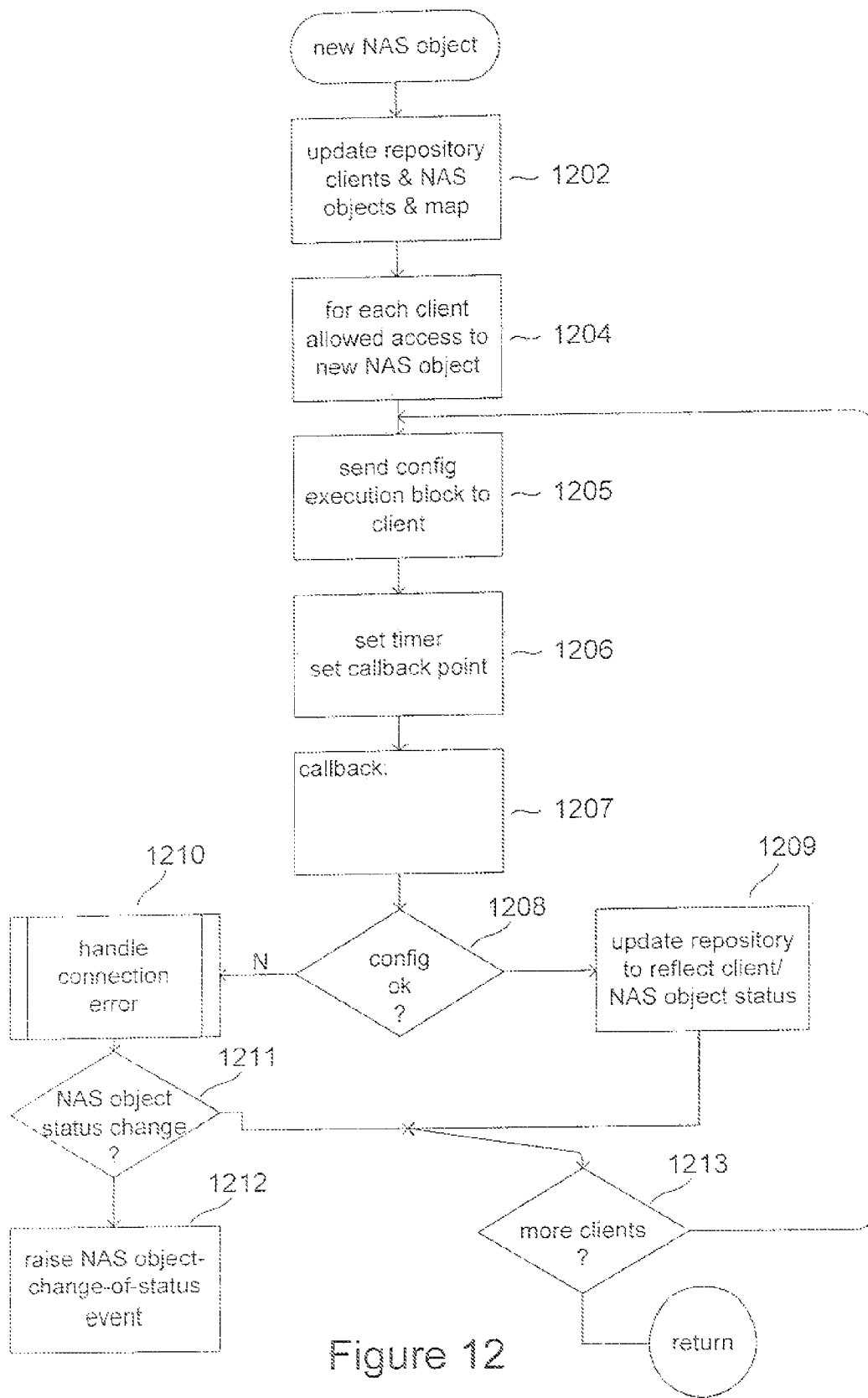
FIG. 12 provides a control-flow diagram for the routine "new NAS object," called in step 818 of the event-handler routine shown in FIG. 8, according to embodiments of the present invention.

FIG. 12 provides a control-flow diagram for the routine "new NAS object," called in step 818 of the event-handler routine shown in FIG. 8, according to embodiments of the present invention. In a first step 1202, the repository is updated to include an entry for the new NAS object, and may also be updated to include new associations between client computers and NAS objects. Then, in the for-loop of steps 1204-1213, each of the client computers that need to connect to the new NAS object, as specified in the client/NAS-object-map table (308 in FIG. 3), are sent a message, including an execution block, directing connection to the new NAS object, using logic similar to the for-loop of steps 1106-1117 in FIG. 11. A system or network administrator may first update the client/NAS-object-map table prior to adding a new NAS object to the networked computer environment so that client connections are automatically made by the master agent.

Figure 13:
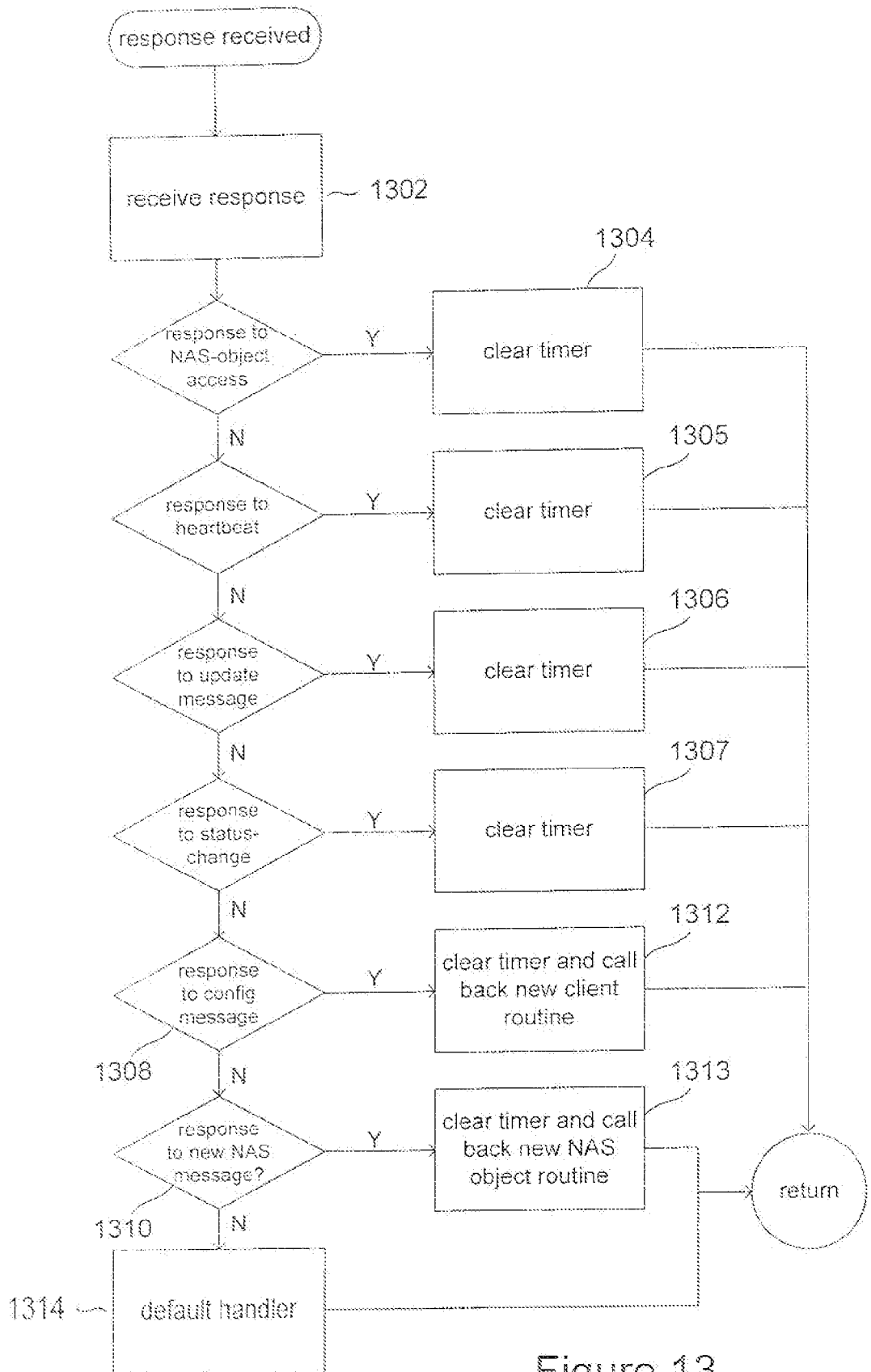
FIG. 13 provides a control-flow diagram for the routine "response received" called in step 822 of the event-handler routine shown in FIG. 8, according to embodiments of the present invention.

FIG. 13 provides a control-flow diagram for the routine "response received" called in step 822 of the event-handler routine shown in FIG. 8, according to embodiments of the present invention. In step 1302, the master agent receives a response from either a NAS object or a client computer. In most cases, including responses received from NAS-object accesses made by the NAS-object-monitoring routine, heartbeat responses returned as a result of heartbeat messages sent by the client-monitor routine, responses to update messages sent by the update-client routine and update-repository-and-clients routines, the timer associated with the originally sent message is cleared, in steps 1304-1307, and any temporary status associated with a queried NAS object or client computer is updated to reflect successful access or heartbeat inquiry. In the case that the response is received for an executable-block-containing configuration message sent by the routine "newclient," as detected in step 1308, or by the routine "newNASObject," as detected in step 1310, then the timer associated with the messages is cleared and a callback is made to the appropriate place in the "newClient" routine and "newNASObject" routines, in steps 1312 and 1313, respectively. Otherwise, a default handler is called in step 1314 to handle any additional types of responses.

Figure 14:
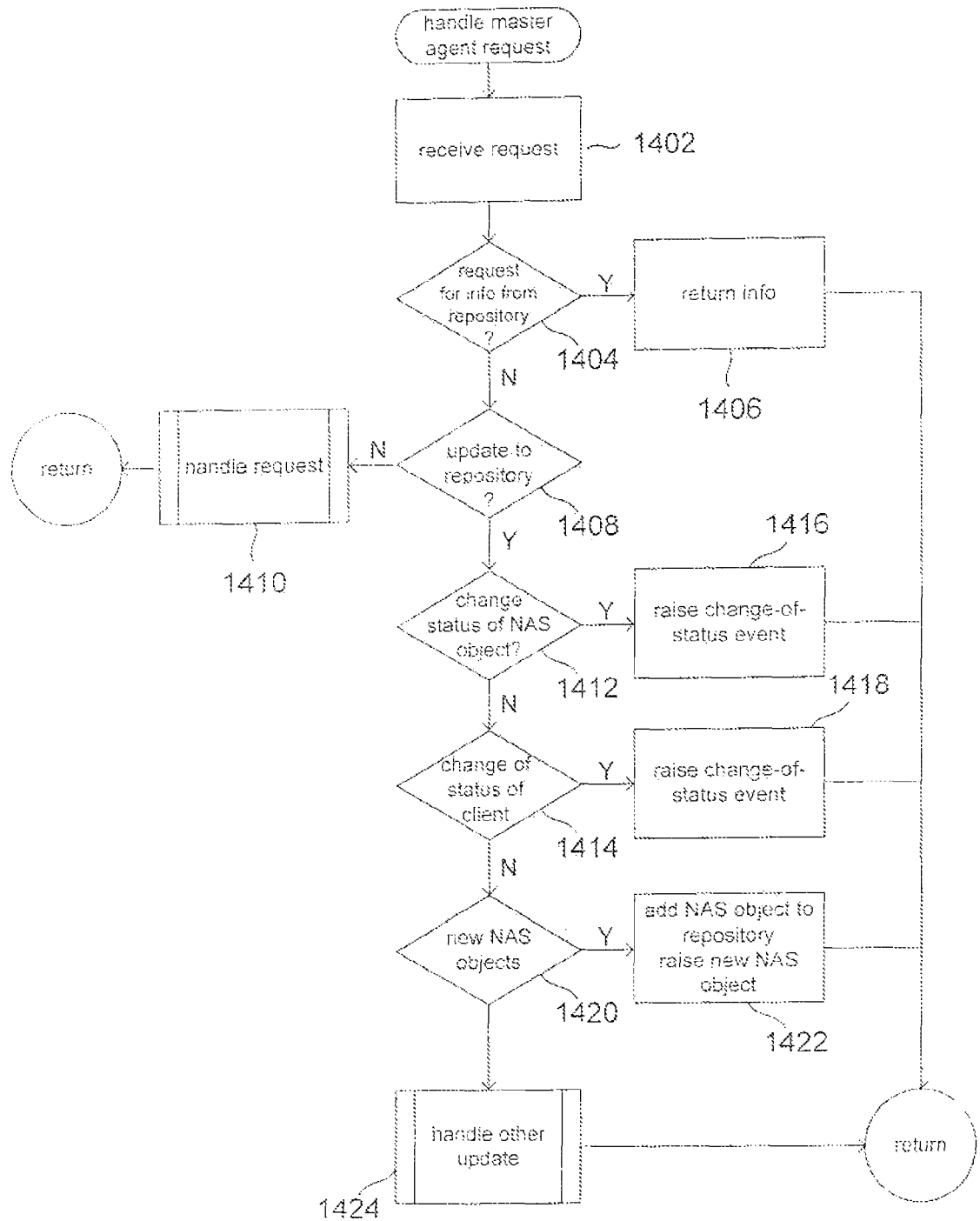
FIG. 14 provides a flow-control diagram for the routine "handle master agent request," called in step 826 of the event-handler routine shown in FIG. 8, according to embodiments of the present invention.

FIG. 14 provides a flow-control diagram for the routine "handle master agent request," called in step 826 of the event-handler routine shown in FIG. 8, according to embodiments of the present invention. Requests are handled by this routine in order to implement a system-administrator or network-administrator interface to allow a network administrator or system administrator to update or configure the repository and view contents of the repository. In step 1402, a request is received from the user interface. If the request is for information from the repository, as determined in step 1404, then the information is returned in step 1406. If the request is to update the repository, as determined in step 1408, then the update is handled by the routine "handle request" in step 1410. Update of the repository may spawn additional events and tasks. If the request is to change the status of a NAS object or client computer, as determined in steps 1412 and 1414, then the appropriate change-of-status events are raised in steps 1416 and 1418, respectively. If the system administrator or network administrator adds a new NAS object, as determined in step 1420, then the new NAS object is added to the repository and a new-NAS-object event is raised, in step 1422. Otherwise, any other type of event that may occur is handled in a default handler of step 1424.

In alternative embodiments, the system-administrator or network-administrator interface may provide a direct command interface to allow a network administrator or system administrator to direct commands to the master agent to connect specific computer systems to specific NAS objects, in real time, to disconnect computer systems from NAS objects, and to otherwise manage and alter the computer-NAS-object connection configuration of the networked computer environment. In this respect, the present invention provides a command-level abstraction of the operation of connecting a computer system to a NAS object that vastly simplifies the connection process, much like graphical-user interfaces simplify tasks that would otherwise require knowing and issuing tens or hundreds of separate command-line commands.

Figure 15:
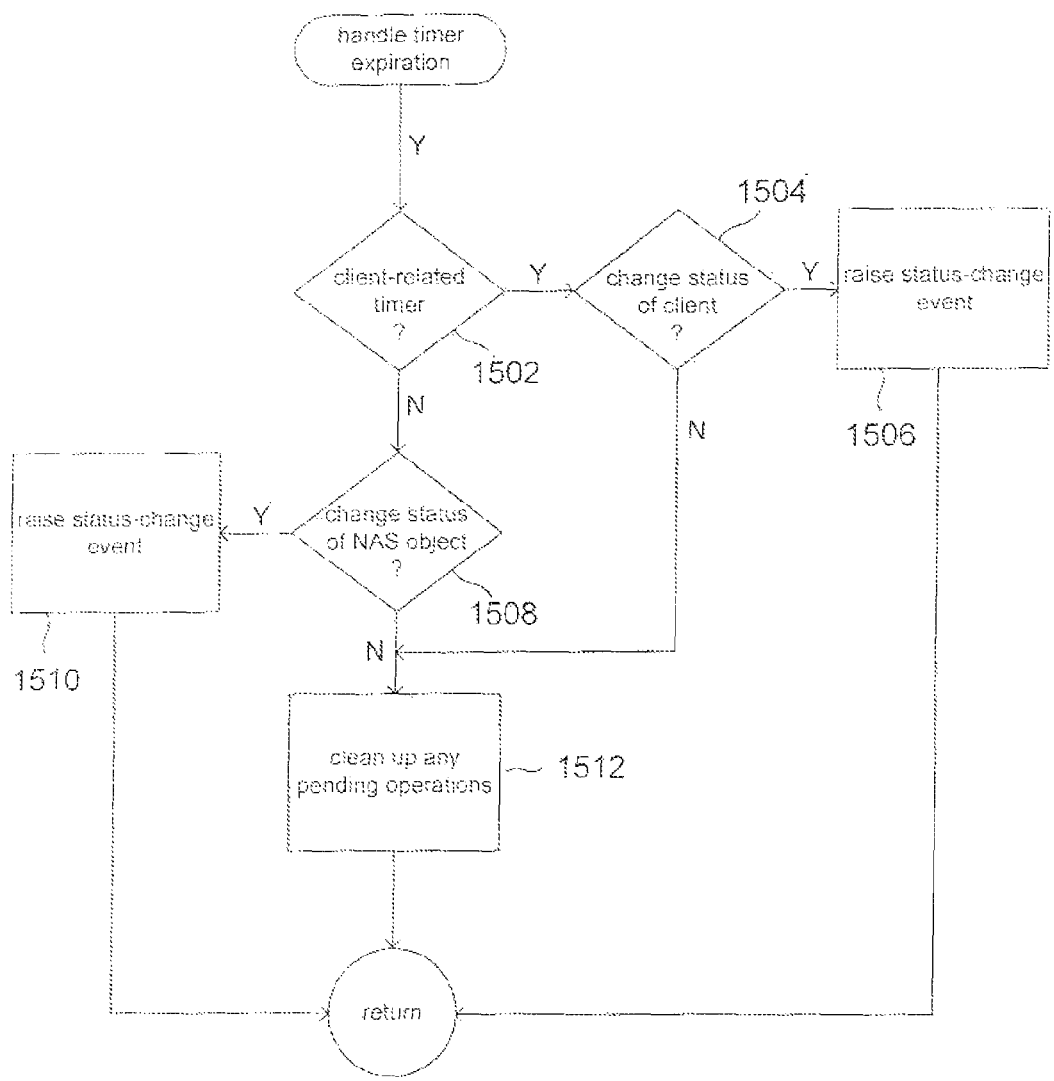
FIG. 15 provides a control-flow diagram for the routine "handle timer expiration," called in step 830 of the event-handler routine shown in FIG. 8, according to embodiments of the present invention.

FIG. 15 provides a control-flow diagram for the routine "handle timer expiration," called in step 830 of the event-handler routine shown in FIG. 8, according to embodiments of the present invention. If the timer that expired is client-computer related, as determined in step 1502, and if the expiration of the timer results in a change of status of the client computer, as determined in step 1504, then a change-of-status event is raised for the client computer in step 1506. Similarly, if the status of a NAS object is changed as a result of a timer expiration, as determined in step 1508, then a change-of-status event is raised for the NAS object in step 1510. Otherwise, any pending operations that can no longer be completed due to the timer expiration are cleaned up in step 1512. Cleanup of pending operations is implementation specific, and may involve a variety of operations depending on the event with which the timer was associated.

Figure 16:
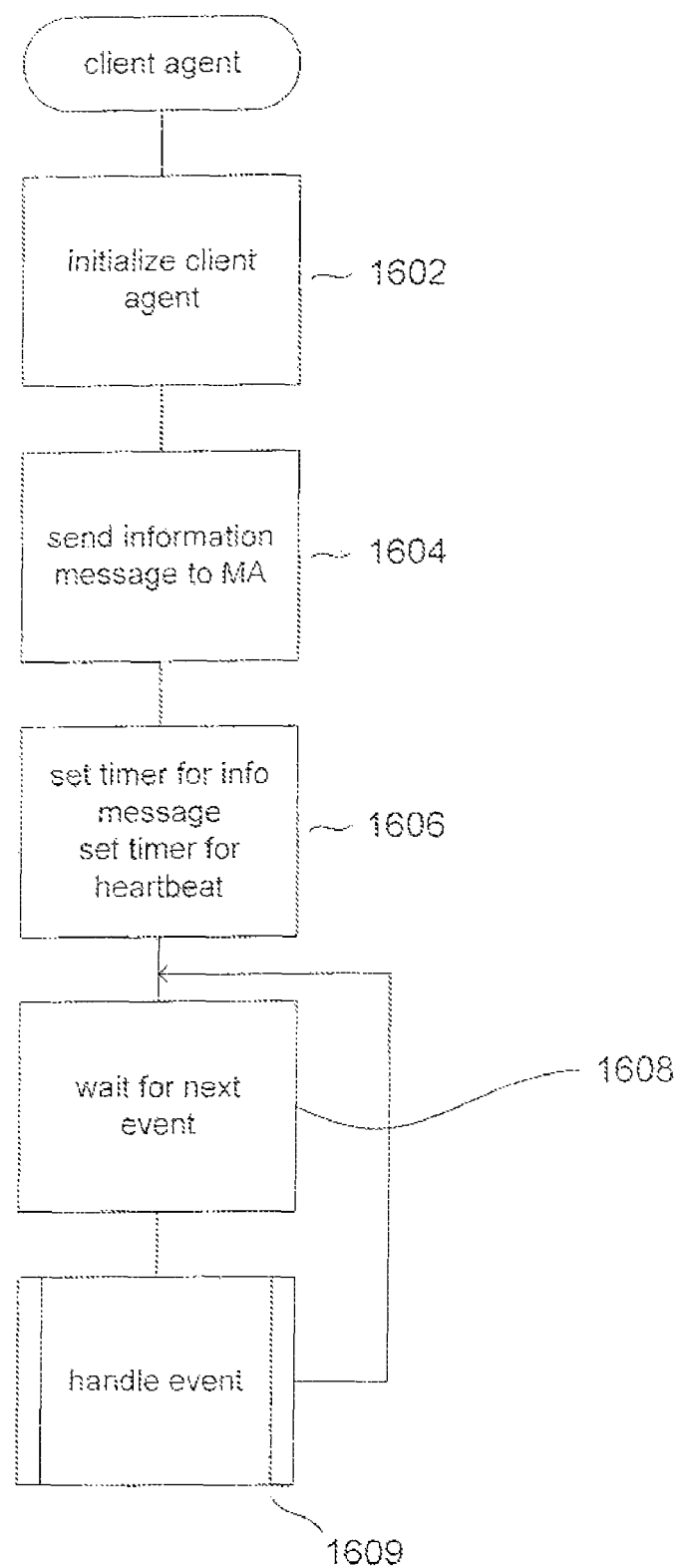
FIG. 16 provides a control-flow diagram for the client agent that runs on each client computer within the work computer environment according to embodiments of the present invention.

FIG. 16 provides a control-flow diagram for the client agent that runs on each client computer within the work computer environment according to embodiments of the present invention. The client agent is initialized upon reboot, re-initialization, or execution of the client agent, in step 1602. The client agent sends an information message to the master agent in step 1604. The client agent is either hard coded with the network address of the master agent, retrieves the network address of the master agent from a known location within the networked computer environment. or receives the address of the master agent by some other means. In step 1606, the client agent sets a timer associated with the information message and also sets a timer for receipt of a next heartbeat message from the master agent. Then, in an endless loop of steps 1608-1609, the client agent waits for events and handles those events.

Figure 17:
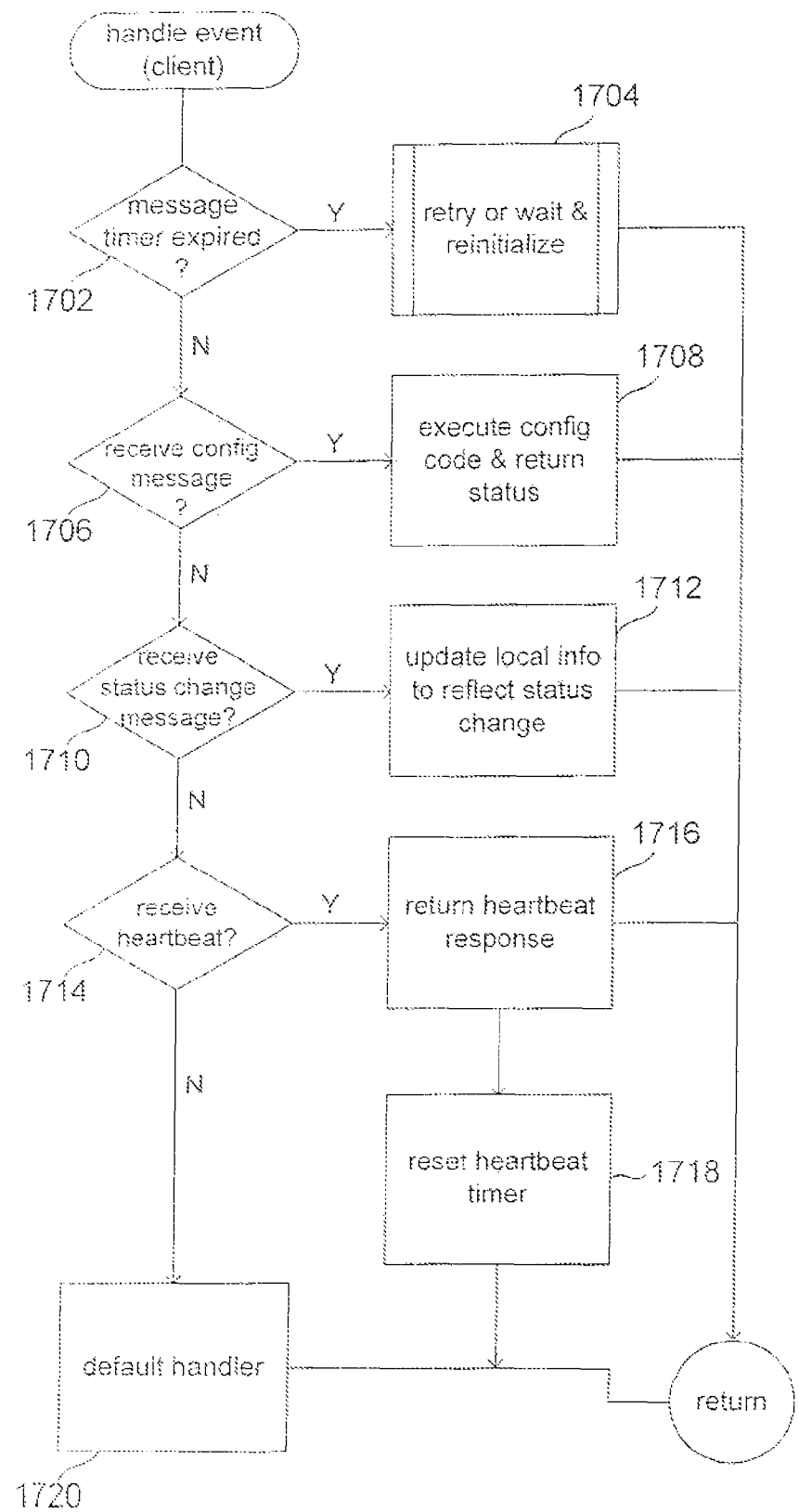
FIG. 17 provides a control-flow diagram for the routine "handle event," called in step 1609 in FIG. 16, according to one embodiment of the present invention.

FIG. 17 provides a control-flow diagram for the routine "handle event," called in step 1609 in FIG. 16, according to one embodiment of the present invention. If the next event to be handled is a message timer expiration, as determined in step 1702, then the client agent either retries sending the message, waits and retries sending the message, or waits and reinitializes itself, in step 1704, depending on the implementation of the client agent and perhaps depending on parameters specified to the client agent on startup. If, on the other hand, the event is reception of a configuration message from the master agent, as determined in step 1704, then the client agent retrieves the executable code block from the configuration message, executes the code block, and returns the status in step 1708 to the master agent. If the event is a reception of a change-of-status message, as determined in step 1710, then the client agent updates local information to reflect that status change in step 1712. For example, if a NAS object's status has changed from "OK" to "failed," then the client agent may remove a remote directory associated with the NAS object from the client computer's directory tree. If the event is a received heartbeat message, as determined in step 1714, then, in step 1716, the client agent returns a heartbeat response and resets the heartbeat timer in step 1718. For other types of events, a default event handler is called in step 1720.

The detailed control-flow diagrams provided in FIGS. 5-17 are intended to show details of one embodiment of the present invention. However, many alternative embodiments are contemplated. For example, while the client agent, in the above-described embodiment, waits for heartbeat messages from the master agent and responds by sending response messages to the master agent, in alternative embodiments, much of the client-agent communications-protocol tasks may be specified in execution blocks sent to the client agent by the master agent and executed by the client agent. In these embodiments, the client agent may be a very simple, lightweight process or thread that primarily launches execution of code blocks received from the master agent. In alternative embodiments, the communications protocol may be simplified by combining response messages with other messages, assuming successful delivery of messages, and using means other than acknowledgement messages to detect communications problems, although with increased latency in detection. At a basic level, the method and system embodiments of the present invention generally need to provide a means for the master agent to send executable code blocks to client agents on client computers for execution, so that, by executing the code blocks, the client agents connect the client computers automatically to NAS objects that they have been configured to connect, or so that the client agents connect the client computers to NAS objects as specified by a high-level connection command input by a system administrator or network administrator to the master agent.

An example pseudo-code executable-code-block template for connecting a client computer to a NAS object and additionally returning a status message to the master agent is provided below:

```
If (NAS Object accessible) {
    Return success Status Message and stop execution
} else {
    If (NAS Object Network Location not accessible) {
        Return failure Status Message and stop execution
    } else {
        [SPECIFIC CONNECTION CODE BLOCK]
    }
    If (NAS Object not accessible) {
        Return failure Status Message and stop execution
    } else {
        Return success Status Message and stop execution
    }
}
Return undefined result Status Message
```

This template can be implemented in any number of languages or scripts executable on the various computer systems of the networked communications environment, with a suitable specific-connection code block inserted in to the position indicated in the above pseudo-code template. An example specific-connection code block used to attempt to mount a mount a Windows (CIFS/Samba) shared filesystem by a Windows system is provided below:

```
net use [{DeviceName I *}]
[\\ComputerName\ShareName[\volume]] [{Password I *I] 1
[/user: [DomainName\lUserNamel
[/user:[DottedDomainName\]UserName] [/user:
[UserName@DottedDomainName] [/savecred] [/smartcard]
[{/delete I I /persistent:{yes I no}}]
```

This is a regular expression in which variables such as "Password," "DeviceName," and other such variable are replaced with specific client-computer information extracted from the client table of the repository by the master agent. Based on client-computer information, the command may end up as:

```
                net use * \\NAS-srv\sharel
    or as:
                net use G: \\NAS-srv\sharel
``` for a particular client computer in certain example networked computer environments. For a Linux system, a suitable specific-connection code block would be:

```
mount -t smbfs //servername/sharename /mountdirectory -o
username=mywindowsusername,password=mywindowspassword
``` and for a Mac, a suitable specific-connection code block would be:

```
mount_smbfs -W myworkgroup //username@netbiosname/share
./myshare
```

This is but one example of an executable code block that may be sent by the master agent to a client computer so that the client computer can automatically connect to a NAS object. This example also demonstrates how an executable code block may need to be constructed by a sequential process, in which template and executable code blocks are selected for insertion into higher-level templates and code blocks, and variables within templates and code blocks instantiated with computer-system-specific and NAS-object-specific values. In general, all of the templates, code blocks, and variable instantiations can be obtained from the central NAS-object repository.

Although the present invention has been described in terms of particular embodiments, it is not intended that the invention be limited to these embodiments. Modifications within the spirit of the invention will be apparent to those skilled in the art. For example, as discussed above, the master agent may support additional operations systematically carried out by client computers with respect to NAS objects, in addition to connection operations, by sending appropriate executable code blocks to the client computers. For example, in the event of NAS-object failures, the master agent may send executable code blocks to the client computers to execute in order to ameliorate the failure. As another example, the master agent may send executable code blocks to client computers to disconnect from NAS objects prior to NAS objects being taken offline for various purposes. Embodiments of the present invention may be implemented using any number of different programming languages for execution on computer systems using any number of different operating systems. In addition to different programming languages, implementations may use different modular organizations, control structures, data structures, variables, and may vary other types of such programming parameters. A repository may include additional types of information, other than those indicated in FIG. 3, and may, in certain cases, contain less information. While the present invention is described, above, with respect to connection of computer systems to NAS objects, embodiments of the present invention may also provide automated connection to, and a command-level interface to allow specific connection to, network-accessible devices and appliances that do not fall within the NAS-object category.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A method for connecting a target computer system in a networked computer environment to target network-attached-storage object in the networked computer environment, the method comprising:
   providing a master-agent executable that continuously executes on a computer system in the networked computer environment;
   constructing, by the master agent, an executable code block that, when executed on the target computer system, connects the target computer system to the target network-attached-storage object; and
   forwarding, by the master agent, the executable code block to the target computer system for execution on the target computer system.

2. The method of claim 1 further comprising:
   providing a central-network-attached-storage-object repository that provides specific executable code blocks and specific code-block templates to the master agent to allow the master agent to construct, for any particular computer-system/network-attached-storage-object pair within the networked computer environment, an executable code block that, when executed on the computer system of the computer-system/network-attached-storage-object pair, connects the computer system of the computer-system/network-attached-storage-object pair to the network-attached-storage-object of the computer-system/network-attached-storage-object pair.

3. The method of claim 2 wherein constructing, by the master agent, an executable code block that, when executed on the target computer system, connects the target computer system to the target network-attached-storage object further comprises:
   accessing the central-network-attached-storage-object repository, by the master agent, to retrieve one or more executable code blocks and code-block templates specific to the target computer system and target network-attached-storage object; and
   constructing, by the master agent, an executable code block from the one or more executable code blocks and code-block templates.

4. The method of claim 2 further comprising:
   providing an interface to allow a system administrator or a network administrator to input data to, and update the contents of the central-network-attached-storage-object repository.

5. The method of claim 4 wherein the central-network-attached-storage-object repository further includes connection-configuration information specifying the connections to network-attached-storage objects needed for each computer system in the networked computer environment, wherein the interface allows a system administrator or a network administrator to input and alter the connection-configuration information, and wherein the master-agent constructs execution blocks for computer systems for which connection-configuration information has been stored in the central-network-attached-storage-object repository.

6. The method of claim 5 wherein, when a computer system within the networked computer environment boots up or re-initializes, the computer system is automatically connected to the network-attached-storage objects that the computer system needs to connect to by:
   sending a message, by a client agent on the computer system, to the master agent;
   receiving the message by the master agent, and, in response accessing, by the master agent, the central-network-attached-storage-object repository to determine the network-attached-storage objects that the computer system needs to connect to,
   constructing one or more executable code blocks that, when executed by the computer system, connects the computer system to the network-attached-storage objects to which the computer system needs to connect, and
   sending the one or more executable code blocks by the master agent to the client agent for execution on the computer system.

7. The method of claim 2 further comprising:
   providing an interface to allow a system administrator or a network administrator to direct a command to the master agent to connect a computer system specified by the command to a network-attached-storage object specified by the command.

8. The method of claim 1 further comprising:
   continuous monitoring of the computer systems by the master agent to detect, and respond to, connection needs of client computers and other connection-configuration tasks that may need to be executed.

9. A master-agent component of a networked computer environment, the master-agent component comprising:
   a master agent that continuously executes on a computer system of the networked computer environment to manage the computer-system/network-attached-storage-object connection configuration of the networked computer environment; and
   a central-network-attached-storage-object repository that provides specific executable code blocks and specific code-block templates to the master agent to allow the master agent to construct, for any particular computer-system/network-attached-storage-object pair within the networked computer environment, an executable code block that, when executed on the computer system of the computer-system/network-attached-storage-object pair, connects the computer system of the computer-system/network-attached-storage-object pair to the network-attached-storage-object of the computer-system/network-attached-storage-object pair.

10. The master-agent component of claim 9 wherein the master agent connects a target computer system in the networked computer environment to a target network-attached-storage object in the networked computer environment by:
    accessing the central-network-attached-storage-object repository to retrieve one or more executable code blocks and code-block templates specific to the target computer system and target network-attached-storage object;
    constructing an executable code block from the one or more retrieved executable code blocks and code-block templates that, when executed on the target computer system, connects the target computer system to the target network-attached-storage object; and
    forwarding, by the master agent, the executable code block to the target computer system for execution on the target computer system.

11. The master-agent component of claim 10 wherein a number of computer systems within the networked computer environment each executes a client agent that receives executable code blocks from the master agent and execute the executable code blocks to connect the computer to one or more network-attached-storage objects.

12. The master-agent component of claim 10 wherein the master agent provides an interface to allow a system administrator or a network administrator to input data to, and update the contents of the central-network-attached-storage-object repository.

13. The master-agent component of claim 12 wherein the central-network-attached-storage-object repository further includes connection-configuration information specifying the connections to network-attached-storage objects needed for each computer system in the networked computer environment, wherein the interface allows a system administrator or a network administrator to input and alter the connection-configuration information, and wherein the master-agent constructs execution blocks for computer systems for which connection-configuration information has been stored in the central-network-attached-storage-object repository.

14. The master-agent component of claim 13 wherein, when a computer system within the networked computer environment boots up or re-initializes, the master agent connects the computer system to the network-attached-storage objects that the computer system needs to connect to by:

receiving a message from a client agent on the computer system;

in response to the message, accessing the central-network-attached-storage-object repository to determine the network-attached-storage objects to which the computer system needs to connect, constructing one or more executable code blocks that, when executed by the computer system, connects the computer system to the network-attached-storage objects to which the computer system needs to connect, and sending the one or more executable code blocks by the master agent to the client agent for execution on the computer system.

15. The master-agent component of claim 12 wherein the master agent provides an interface to allow a system administrator or a network administrator to direct a command to the master agent to connect a computer system specified by the command to a network-attached-storage object specified by the command.

* * * * *